United States Patent
Kitazawa et al.

(10) Patent No.: US 9,910,271 B2
(45) Date of Patent: Mar. 6, 2018

(54) ACTUATOR DEVICE, OPTICAL DEFLECTOR, AN IMAGE PROJECTION APPARATUS, AND IMAGE FORMING APPARATUS

(71) Applicants: Tomofumi Kitazawa, Kanagawa (JP); Kazuhiko Tsukamoto, Kanagawa (JP)

(72) Inventors: Tomofumi Kitazawa, Kanagawa (JP); Kazuhiko Tsukamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/372,825

(22) Filed: Dec. 8, 2016

(65) Prior Publication Data
US 2017/0176743 A1    Jun. 22, 2017

(30) Foreign Application Priority Data

Dec. 21, 2015  (JP) .................................. 2015-248316
Oct. 26, 2016  (JP) .................................. 2016-209961

(51) Int. Cl.
*G02B 26/10*   (2006.01)
*H04N 1/06*    (2006.01)
*H04N 1/028*   (2006.01)
*H04N 1/024*   (2006.01)
*H04N 1/29*    (2006.01)

(52) U.S. Cl.
CPC ......... *G02B 26/105* (2013.01); *H04N 1/0283* (2013.01); *H04N 1/02409* (2013.01); *H04N 1/06* (2013.01); *H04N 1/29* (2013.01)

(58) Field of Classification Search
CPC .... H04N 1/06; H04N 1/0283; H04N 1/02409; H04N 1/29; G02B 26/10; G02B 26/105
See application file for complete search history.

(56) References Cited

U.S. PATENT DOCUMENTS

| 6,067,421 | A | 5/2000 | Kitazawa et al. |
| 7,589,878 | B2 * | 9/2009 | Nakamura ........... G02B 26/123 347/232 |
| 7,719,739 | B2 * | 5/2010 | Gomi ................. G02B 27/0031 250/236 |

(Continued)

FOREIGN PATENT DOCUMENTS

| JP | 2002-300497 | 10/2002 |
| JP | 2004-312347 | 11/2004 |

(Continued)

*Primary Examiner* — Jennifer L. Doak
(74) *Attorney, Agent, or Firm* — Cooper & Dunham LLP

(57) ABSTRACT

An actuator device includes a frame, a movable member to rotate about a rotation axis, a reflection member formed on the movable member to reflect a light flux that enters the reflection member, a first deformable member disposed on the frame to support and move the movable member, at least one first driver to deform the first deformable member, a detection-use line formed on the first deformable member and on the movable member to allow an electric current, and a light shield unit disposed at least one of a light incident side and a light exit side of the reflection member. The light shield unit blocks at least one of an entry of the light flux to the reflection member and an exit of the light flux from the reflection member when the detection-use line is damaged.

11 Claims, 14 Drawing Sheets

(56) References Cited

U.S. PATENT DOCUMENTS

| | | | |
|---|---|---|---|
| 2003/0210453 A1* | 11/2003 | Noda | G02B 26/0841 359/290 |
| 2009/0135460 A1* | 5/2009 | Kim | G02B 26/0841 359/201.1 |
| 2010/0309536 A1 | 12/2010 | Akanuma et al. | |
| 2012/0120470 A1 | 5/2012 | Kitazawa et al. | |
| 2015/0062683 A1 | 3/2015 | Akanuma et al. | |
| 2016/0109697 A1 | 4/2016 | Nakagawa et al. | |

FOREIGN PATENT DOCUMENTS

| | | |
|---|---|---|
| JP | 2004-333698 | 11/2004 |
| JP | 2006-072319 | 3/2006 |
| JP | 2006-085189 | 3/2006 |
| JP | 2010-019949 | 1/2010 |
| JP | 2010-086000 | 4/2010 |
| JP | 2014-002394 | 1/2014 |
| JP | 2015-132762 | 7/2015 |

* cited by examiner

ACTUATOR DEVICE, OPTICAL DEFLECTOR, AN IMAGE PROJECTION APPARATUS, AND IMAGE FORMING APPARATUS

CROSS-REFERENCE TO RELATED APPLICATIONS

This application claims priority pursuant to 35 U.S.C. § 119(a) to Japanese Patent Application Nos. 2015-248316, filed on Dec. 21, 2015 and 2016-209961, filed on Oct. 26, 2016 in the Japan Patent Office, the disclosures of which are incorporated by reference herein in their entirety.

BACKGROUND

Technical Field

This disclosure relates to an actuator device, an optical deflector using the actuator device, an image projection apparatus using the optical deflector, and an image forming apparatus using the optical deflector.

Background Art

Actuator devices such as piezoelectric actuators manufactured using the micro machining technology are used in various fields such as high-speed moveable micro-structured devices. Since the high-speed moveable micro-structured devices move in a greater range with high speed, breakage or failure may occur when a greater force impacts the high-speed moveable micro-structured devices. For example, when the actuator device is used for optical scanning, breakage or failure may occur to the actuator device, and the actuator device fails and is not driven, in which the optical scanning stops and further the light flux reflected on the actuator device may be focused onto one point, and thereby the breakage or failure of the actuator device may cause the breakage or failure of other components or of the device.

SUMMARY

In one aspect of the present disclosure, an improved actuator device is devised. The actuator device includes a frame, a movable member to rotate about a rotation axis, a reflection member formed on the movable member to reflect a light flux that enters the reflection member, a first deformable member disposed on the frame to support and move the movable member, at least one first driver to deform the first deformable member, a detection-use line formed on the first deformable member and on the movable member to allow an electric current, and a light shield unit disposed at least one of a light incident side and a light exit side of the reflection member. The light shield unit blocks at least one of an entry of the light flux to the reflection member and an exit of the light flux from the reflection member when the detection-use line is damaged.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
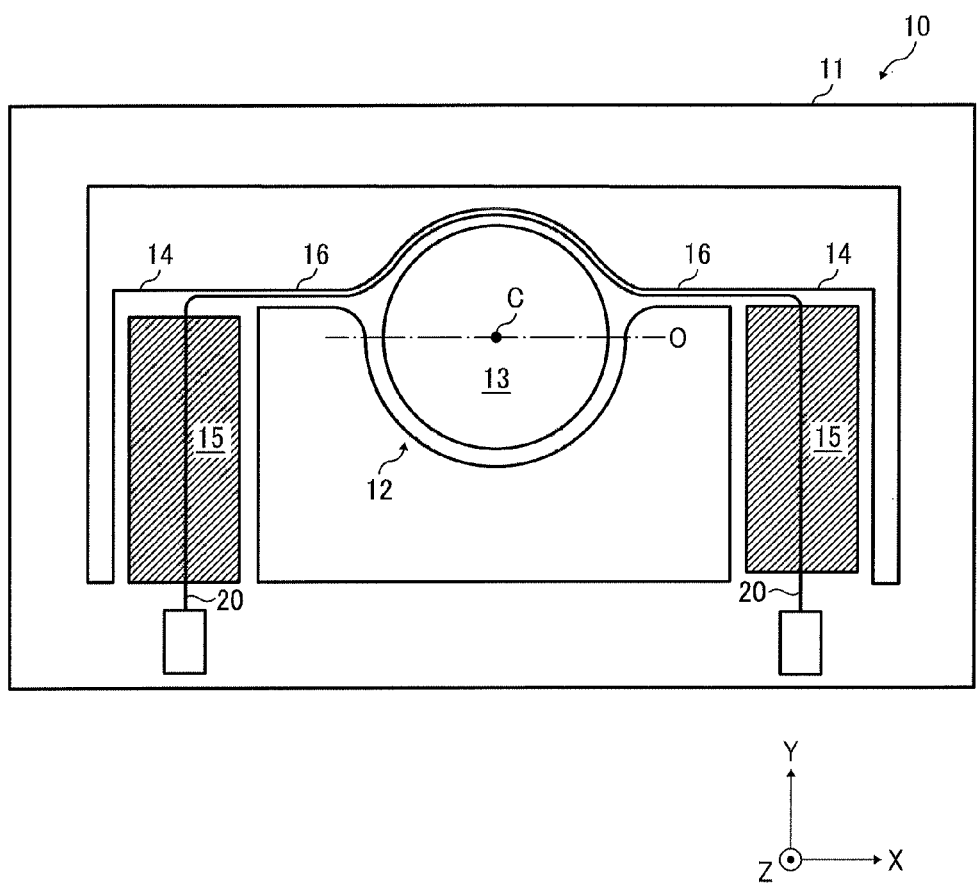
FIG. 1 illustrates a schematic view of an example of an actuator device of a first embodiment of the present disclosure.

The accompanying drawings are intended to depict exemplary embodiments of the present disclosure and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present disclosure.

In addition, it should be noted that the terminology used herein is for the purpose of describing particular embodiments only and is not intended to be limiting of the present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, a description is given one or more apparatuses or systems of one or more embodiments of the present disclosure.

First Embodiment

FIG. 1 is a schematic view of an oscillation mirror unit 10, which is an example of an actuator device of the first embodiment. In this configuration, the oscillation mirror unit 10 is set with a rotation axis O as a virtual axis, and a direction parallel to the rotation axis O is the X direction, a direction perpendicular to the rotation axis O and X direction is the Y direction, and a direction perpendicular to X direction and Y direction is the Z direction.

The oscillation mirror unit 10 includes, for example, a support frame 11, a movable member 12, a reflection member 13, a pair of deformable members 14, a plurality of drivers 15, a plurality of elastic support members 16, and a detection-use line 20. The support frame 11 is fixed to a casing of the oscillation mirror unit 10. The movable member 12 is rotatably supported by the support frame 11 by setting the rotation axis O as the center axis for movement of the movable member 12. The reflection member 13 is formed on a +Z direction face of the movable member 12, which is used as a face where the light flux enters and exits. The pair of deformable members 14 support the movable member 12 while allowing the oscillation of the movable member 12 with respect to the support frame 11. Each of the plurality of drivers 15 is disposed on a respective one of the deformable members 14 to deform the deformable member 14. The detection-use line 20 is formed on at least a part of each of the deformable members 14.

The reflection member 13 is a reflection face having enhanced reflectance, which is formed at a region irradiated by light flux L. For example, the center C of the reflection member 13 is set at the rotation axis O of the movable member 12, and further, the center C of the reflection member 13 and the center of the light flux L, which is a position where light intensity of the light flux L becomes a peak, are aligned with the gravitational center of the movable member 12. Further, the rotation center of the movable member 12 can be aligned with the center of the light flux L. The movable member 12 can be formed into, for example, a circular plate. The reflection member 13 is formed on the surface of the movable member 12. The elastic support member 16 is connected to each end of the movable member 12 such as the circular plate, which means that when the elastic support member 16 is connected to the each end of the movable member 12, the elastic support member 16 is connected near the end of the rotation axis O, and the elastic support member 16 is set parallel to the X axis. The movable member 12 is coupled or linked to the deformable member 14 via the elastic support member 16. Further, when the deformable member 14 employs a torsion bar, which can be twisted to transmit a force, the deformable member 14 can be coupled or linked to the movable member 12 directly.

Figure 2A:
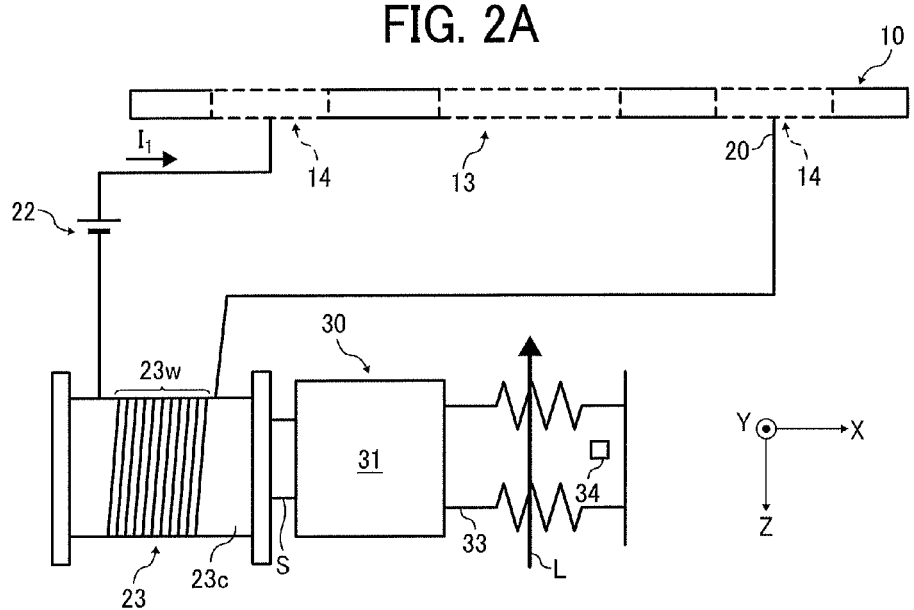
FIGS. 2A, 2B, and 2C illustrate an example of an operation of the actuator device of FIG. 1.
Figure 2B:
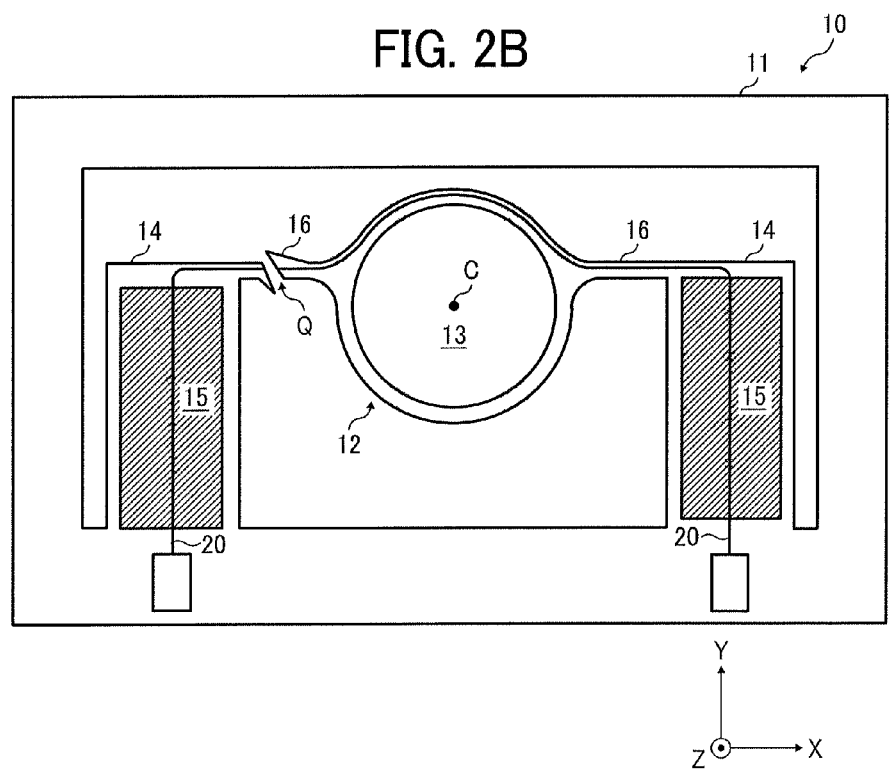

As indicated in FIGS. 2A and 2B, the oscillation mirror unit 10 includes, for example, a power source 22, a light shield driver 23, and a light shield unit 30. The detection-use line 20 is connected to the power source 22. In this disclosure, it can be assumed that the light shield driver 23 and the detection-use line 20 collectively configure a circuit to move the light shield unit 30 to be described later. The light shield unit 30 can be moved in the ±X direction using the light shield driver 23. The power source 22 is, for example, a constant voltage power source, and the power source 22 supplies a constant current such as a current $I_1$ to the detection-use line 20. The light shield driver 23 employs, for example, a solenoid actuator. When the current $I_1$ is being supplied to the detection-use line 20, a magnetic substance S can be biased toward the −X direction as described later.

Figure 2C:
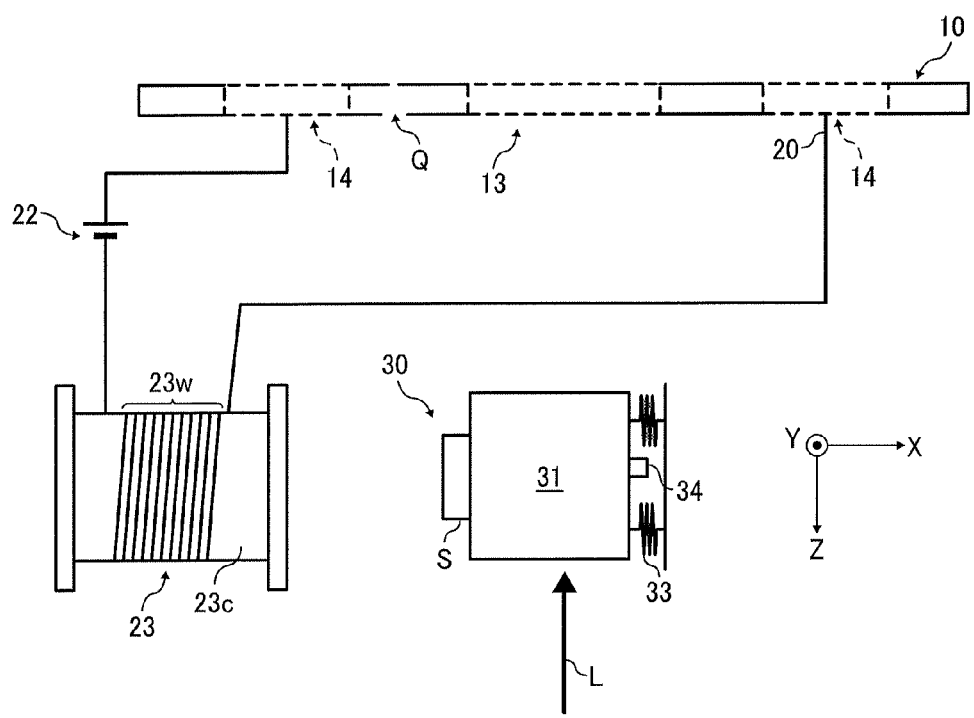

As indicated in FIG. 2A, the light shield driver 23 includes, for example, a metal core 23c such as an iron core, and a winding wire 23w made of conductive material such as copper. The winding wire 23w is used as a part of the detection-use line 20. As indicated in FIGS. 2A and 2C, the winding wire 23w is disposed as an electrical conductor in the shape of a coil, spiral or helix. The hole in the center of the coil is used as a core area, into which the metal core 23c can be disposed. Each loop of the winding wire 23w is called a turn, which means the winding wire 23w has a plurality of turns. In the winding wire 23w, each of the turns must be insulated electrically from each other. For example, the turns of the winding wire 23w can be insulated with a coating of nonconductive insulation such as plastic or enamel to prevent the current from passing between the turns, or the turns of the winding wire 23w can be insulated by setting a space between the turns. Further, the winding wire 23w and the metal core 23c must be insulated from each other. For example, the winding wire 23w and the metal core 23c can be insulated by setting a space between the winding wire 23w and the metal core 23c, or the winding wire 23w and the metal core 23c can be insulated by disposing a nonconductive insulation form such as plastic between the winding wire 23w and the metal core 23c.

As indicated in FIG. 2A, the light shield unit 30 includes, for example, a shield member 31, the magnetic substance S, and a spring 33. The shield member 31 is used to shield or block the light flux L. The magnetic substance S is attached to the −X direction end of the shield member 31, which means the magnetic substance S and the shield member 31 can be collectively moved into the −X direction and the +X direction. The spring 33 used as a biasing member is attached to the +X direction end of the shield member 31. Specifically, when the current $I_1$ is being supplied to the detection-use line 20, the magnetic substance S and the shield member 31 are being collectively pulled toward the −X direction by the light shield driver 23 while the magnetic substance S and the shield member 31 are being collectively biased toward the +X direction by the spring 33. In this disclosure, the spring, which is an example of a biasing member, can be disposed at any position as long as the biasing member can perform the effect described in this disclosure.

As indicated in the light shield unit 30 of FIG. 2A, when the detection-use line 20 is under a normal operation condition, which means when damage such as breaking or fracturing does not occur to the detection-use line 20, and the current $I_1$ is being supplied to the detection-use line 20, the shield member 31 is maintained at a position that does not block the light flux L. Then, as indicated in FIGS. 2B and 2C, when a portion Q of the detection-use line 20 is damaged (e.g., broken, fractured) and a damaged condition (e.g., broken condition) occurs, the current $I_1$ is not supplied in the detection-use line 20. When the current $I_1$ is not supplied in the detection-use line 20, the magnetic substance S and the shield member 31 are not pulled toward the −X direction by the light shield driver 23, which means the pull force is not generated by the light shield driver 23. When the magnetic substance S and the shield member 31 are not pulled by the light shield driver 23, the magnetic substance S and the shield member 31 are collectively moved to the +X direction by the effect of the biasing force of the spring 33, with which the shield member 31 blocks the light flux L as indicated in FIG. 2C.

As indicated in FIGS. 2A and 2C, the light shield unit 30 includes, for example, a stopper 34. The stopper 34 is disposed at a portion corresponding to the +X direction end of a moveable range of the shield member 31, which means that the stopper 34 is disposed at a position corresponding to one end of the moveable range of the shield member 31. With this configuration, when the current $I_1$ is not supplied in the detection-use line 20, and the shield member 31 is biased to the +X direction by the effect of the spring 33, the shield member 31 is moved to the +X direction by the effect of the spring 33, and then the shield member 31 is stopped at the end of moveable range by the stopper 34.

The light shield driver 23 can be used to detect a flow of the current $I_1$ in the detection-use line 20. Specifically, when the damage occurs to the detection-use line 20, and then the current $I_1$ is not supplied in the detection-use line 20, the light shield driver 23 detects that the current $I_1$ is not supplied in the detection-use line 20 because the light shield driver 23 and the detection-use line 20 are configured as indicated in FIGS. 2A, 2B and 2C, in which the light shield driver 23 detects a damaged condition of the detection-use line 20. Therefore, the light shield driver 23 can be used as a damaged condition detector that detects the damaged condition of the detection-use line 20. Specifically, when the flow of the current $I_1$ is stopped, the light shield driver 23 (i.e., damaged condition detector) moves the shield member 31 to a position that blocks the entry of the light flux L to the reflection member 13, which means the light shield driver 23 moves the shield member 31 to a position that blocks the light path of the light flux L. Therefore, when the light shield driver 23 detects the damaged condition of the detection-use line 20, the entry of the light flux L to the reflection member 13 can be blocked. Further, when the light shield driver 23 detects the damaged condition of the detection-use line 20, the shield member 31 is set at a position where the light flux L has the maximum intensity such as the point of greatest convergence of the light flux L.

As to the first embodiment, as indicated in FIG. 1, the detection-use line 20 is formed on the pair of deformable members 14 and the movable member 12 to send the current $I_1$ in the detection-use line 20. Specifically, the detection-use line 20 is formed from one end (i.e., −Y direction end) of one of the deformable members 14 (i.e., disposed at the +X direction end of the movable member 12) and along one direction on the one of the deformable members 14, on the movable member 12, on another one of the deformable members 14 (i.e., disposed at the −X direction end of the movable member 12), and to one end (i.e., −Y direction end) of another one of the deformable members 14. As indicated in FIG. 1, the detection-use line 20 is formed as one line of traversable pattern, which means the detection-use line 20 does not intersect with other line, and has no portion that the detection-use line 20 is formed for a plurality of times. As to the detection-use line 20 formed with the traversable pattern, when the breakage or failure occurs at one point on the detection-use line 20, the current $I_1$ is stopped by the breakage or failure, with which the breaking or fracturing can be detected, and then the light shield driver 23 prevents the entry of the light flux L to the reflection member 13 by detecting the stop of flowing of the current $I_1$. Further, when the detection-use line 20 is formed with the traversable pattern, the detection-use line 20 can be formed with a turn-back pattern along the line path, in which the detection-use line 20 is turned back at the movable member 12.

It should be noted that although as illustrated in FIG. 1, the oscillation mirror unit 10 includes the pair of deformable members 14 next to the movable member 12, but is not limited hereto. For example, the oscillation mirror unit 10 can be configured with one deformable member 14 disposed next to the movable member 12 to support and move the movable member 12.

As to the plurality of deformable members 14, one deformable member 14 (e.g., first deformable member) is disposed at the −X direction side of the movable member 12, and the other deformable member 14 (e.g., second deformable member) is disposed at the +X direction side of the movable member 12. The one deformable member 14 (e.g., first deformable member) and the other deformable member 14 (e.g., second deformable member) are symmetrically arranged about the center C.

Both of the deformable members 14 is, for example, a flexible member having one side extending along the Y direction, and another side extending along the X direction. One end of the deformable member 14 at the −Y direction end is linked to and supported by the support frame 11, and the other end of the deformable member 14 at the +Y direction end is formed with the elastic support members 16 extending along the X direction. Further, as described above, the detection-use line 20 is disposed on an outer face such as a top face of the deformable member 14, which is the top face in the +Z direction.

Further, one end of the one deformable member 14 (e.g., first deformable member) at the +X direction side is linked to the movable member 12 via the elastic support member 16, and one end of the other deformable member 14 (e.g., second deformable member) at the −X direction side is linked to the movable member 12 via the elastic support member 16, with which the one deformable member 14 (e.g., first deformable member) and the other deformable member 14 (e.g., second deformable member) support the movable member 12. The driver 15 is formed on a face of the deformable member 14 at the +Z direction side. The driver 15 is, for example, a piezoelectric element that can deform the deformable member 14 so that the movable member 12 can be rotated about the rotation axis O. As to the first embodiment, the driver 15 uses the piezoelectric element, and the piezoelectric driving method, but is not limited thereto. For example, the electromagnetic driving method can be used to deform the deformable member 14 by applying an electromagnetic force, or the electrostatic driving method can be used to deform the deformable member 14 by applying a charge accumulated in the deformable member 14. When the driver 15 uses the piezoelectric driving method, the expression of applying voltage is used. When the driver 15 uses the electromagnetic driving method, the expression of applying force is used. When the driver 15 uses the electrostatic driving method, the expression of applying charge is used.

Figure 3:
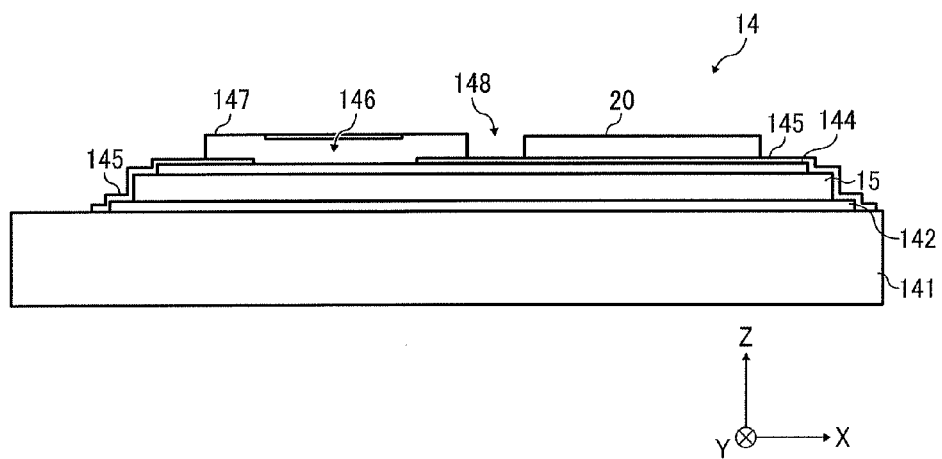
FIG. 3 is a cross-sectional view of a deformable member of the actuator device of FIG. 1.

As indicated in FIG. 3, the deformable member 14 includes, for example, a silicon base 141, a lower electrode 142, an upper electrode 144, the driver 15, an insulation layer 145, and a line pattern 147, and the detection-use line 20. The lower electrode 142 is formed on the silicon base 141. The upper electrode 144 is disposed as a counter electrode of the lower electrode 142. The driver 15 such as a piezoelectric layer or film is formed between the lower electrode 142 and the upper electrode 144. A silicon oxide layer is formed on a surface of the silicon base 141 by applying the heat treatment. The insulation layer 145 is formed on a part of a face of the upper electrode 144 at the +Z direction side to cover the upper electrode 144. The line pattern 147 is formed on another part of the face of the upper electrode 144 where the insulation layer 145 is not formed, which is also corresponded to a through hole 146. The detection-use line 20, which is a conductive line pattern, is formed on a face of the insulation layer 145 at the +Z direction side while setting a gap 148 with the line pattern 147.

When a voltage is applied to the upper electrode 144 and the lower electrode 142 via the line pattern 147, the deformable member 14 deforms. Specifically, when the voltage is applied to the upper electrode 144 and the lower electrode 142, the driver 15 shrinks or expands depending on a voltage difference occurring between the upper electrode 144 and the lower electrode 142. As indicated in FIG. 3, since the deformable member 14 includes the driver 15, when the driver 15 shrinks or expands, the deformable member 14 warps into the +Z direction and −Z direction. When the deformable member 14 deforms or warps, the deformation of the deformable member 14 is transmitted to the movable member 12 via the elastic support members 16 having a torsion bar configuration, with which the movable member 12 rotates or pivots about the rotation axis O as the center axis of the movement of the movable member 12.

Since the reflection member 13 rotates in synchrony with the movable member 12 as the latter rotates or pivots, the reflection member 13 deflects the light flux L that enters the reflection member 13. Therefore, the oscillation mirror unit 10 can be used as an optical deflector, which is an example of the actuator device employing the piezoelectric driving method, which may be referred to as a piezoelectric actuator device.

The piezoelectric actuator device is a micro-structured device having a complex microstructure configuration requiring enhanced dimensional precision such as a tiny gap or space between the deformable member 14, the movable member 12, and the support frame 11. The breakage or non-breakage of the micro-structured device is required to be determined precisely, but it is not so easy to detect or determine the breakage or non-breakage of the micro-structured device. Conventionally, the breakage or non-breakage of the micro-structured device can be determined using software installed in a control unit, in which features such as a speed when the micro-structured device is driven are acquired as data, and the acquired data can be compared with features such as a speed stored in a memory. However, the determination of the breakage or non-breakage of the micro-structured device using the software may have some issues. For example, if the determination criteria is set with a strict value, it may be determined that abnormality occurs due to the noise even if the micro-structured device is operated normally, or if the determination criteria is set with a loose value, it may be determined that abnormality does not occur even if the breakage actually occurs to the micro-structured device, and thereby the operation of the micro-structured device is continued. If the actual breakage is not detected and the operation of the micro-structured device is continued, the light flux such as laser light reflected on the mirror is directed and irradiated only to a specific position in the device or apparatus, with which the breakage of failure the device or apparatus may occur.

Therefore, as to the first embodiment, as indicated in FIG. 3, the detection-use line 20 is formed on the pair of deformable members 14 and the movable member 12, supported by the deformable members 14.

As to the first embodiment indicated in FIG. 2, the oscillation mirror unit 10 includes, for example, the plurality of deformable members 14, the plurality of drivers 15 to deform the plurality of deformable members 14, the detection-use line 20 formed on the deformable members 14, the light shield driver 23 to detect the damaged condition of the detection-use line 20 based on a detection result of the current flow in the detection-use line 20, and the light shield unit 30. The light shield unit 30 can block at least one of the entry of the light flux L to the reflection member 13 and the exit of the light flux L from the reflection member 13 when the detection-use line 20 is damaged such as broken or failed.

Therefore, when the detection-use line 20 is damaged such as broken, and then the flow of the current $I_1$ is stopped and the breakage or failure of micro-structured portion such as the deformable member 14 can be detected with enhanced precision.

As to the first embodiment, the detection-use line 20 is formed on the deformable members 14 and the movable member 12. Specifically, the detection-use line 20 is formed one end of one of the deformable members 14, on the one of the deformable members 14, on the movable member 12, on another one of the deformable members 14, and to one end of another one of the deformable members 14. Therefore, the detection-use line 20 is formed as one line of traversable pattern, which means the detection-use line 20 does not intersect with other line, and has no portion that the detection-use line 20 is formed for a plurality of times.

As to the first embodiment, the detection-use line 20 is formed on an outer face such as a top face of the deformable member 14, which is the top face at the +Z direction side of the deformable member 14, which means the detection-use line 20 is formed on the same side of the light incident side of the light flux L. With this configuration, the detection-use line 20 does not intersect with the line pattern 147, and further, the activation of the driver 15 caused by the current leak from the detection-use line 20 can be prevented. As to the first embodiment indicated in FIG. 2, the light shield unit 30 is disposed at the position that can block the entry of the light flux L to the reflection member 13 when the current $I_1$ is not supplied in the detection-use line 20, but is not limited thereto. Further, the light shield unit 30 can be disposed at a position that can block the exit of the light flux L from the reflection member 13 when the current $I_1$ is not supplied in the detection-use line 20, in which the irradiation of the light flux L to devices other than the reflection member 13 can be prevented. The light shield unit 30 can be disposed at least one of a light incident side and a light exit side of the reflection member 13.

First Variant Example of First Embodiment

Figure 4:
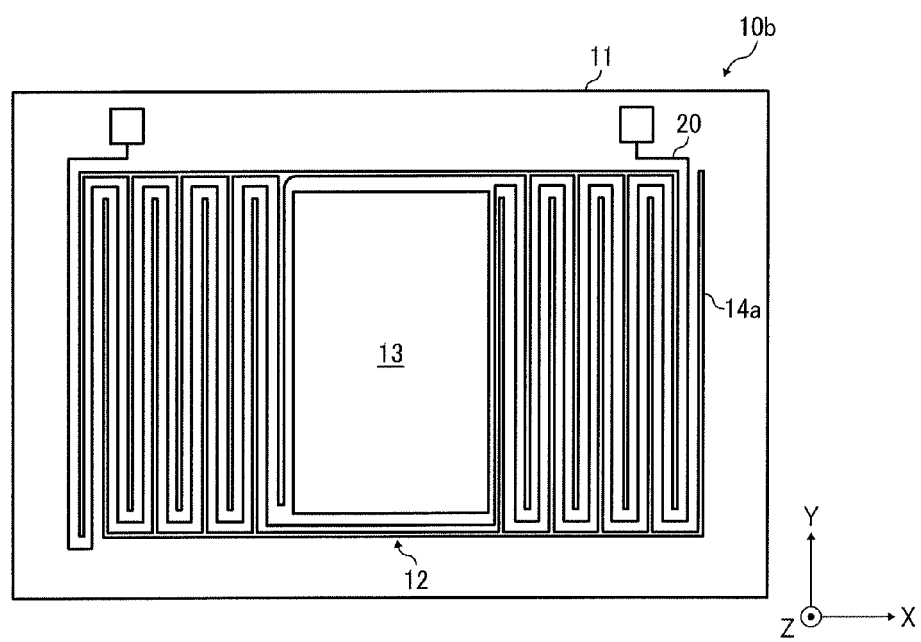
FIG. 4 illustrates a plan view of a first variant example of the deformable member.

As to the first embodiment indicted in FIGS. 1 to 3, the deformable member 14 employs a square or rectangular flexible member for the oscillation mirror unit 10, but is not limited thereto. For example, FIG. 4 illustrates an oscillation mirror unit 10b employing a meandering deformable member 14a as a first variant example of the first embodiment. The meandering deformable member 14a includes a plurality of flexible members set parallel to the Y axis, and the flexible members are continued at the ends of the flexible members. When the meandering deformable member 14a is employed, the detection-use line 20 may be also formed into a meandering pattern. Hereinafter, the configuration described for the first embodiment is mentioned by attaching the same references.

Figure 5:
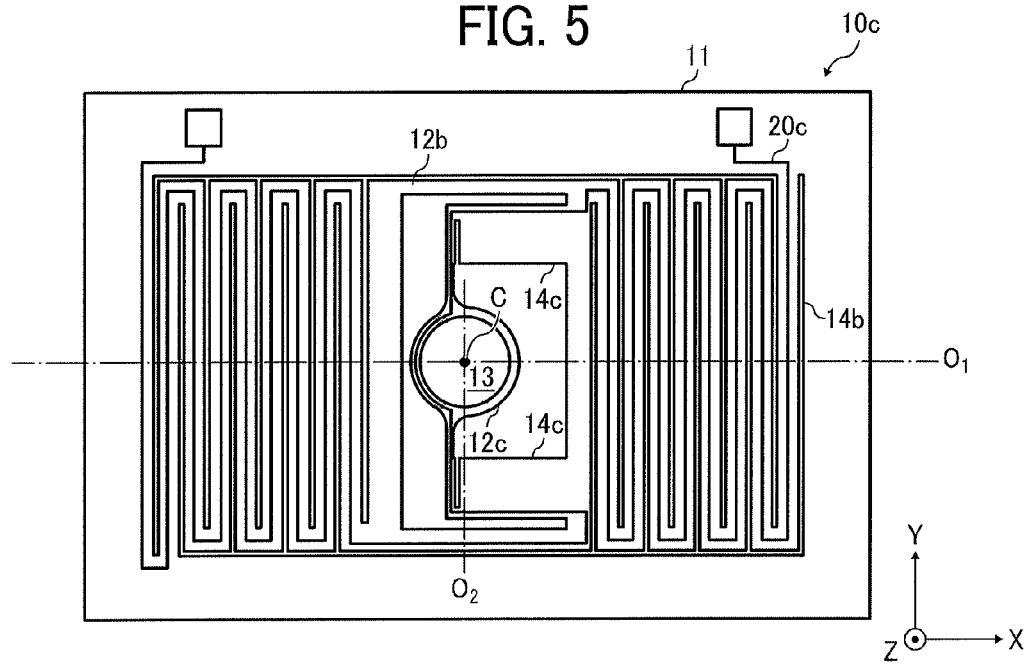
FIG. 5 illustrates a plan view of a second variant example of the deformable member.

Further, the first embodiment and the first variant example (FIG. 4) can be combined as an oscillation mirror unit 10c used as a second variant example as illustrated in FIG. 5, in which the mirror of the oscillation mirror unit 10c is rotatably supported about two axes such as a first rotation axis O1 and a second rotation axis O2.

Second Variant Example of First Embodiment

As to the second variant example, as illustrated in FIG. 5, the oscillation mirror unit 10c includes, for example, a pair of meandering deformable members 14b, a first movable member 12b, a deformable member 14c, a second movable member 12c, and a detection-use line 20c. The long side direction of the meandering deformable member 14b is set parallel to the Y axis direction. The first movable member 12b is a frame supported by the meandering deformable member 14b. The deformable member 14c is disposed on the first movable member 12b. The second movable member 12c, supported by the deformable member 14c, is set in the first movable member 12b. The detection-use line 20c is continuously formed on the meandering deformable member 14b, the first movable member 12b, the deformable member 14c, and the second movable member 12c as a power supply line. The damaged condition such as breaking of the detection-use line 20c can be detected when any one of the meandering deformable member 14b, the first movable member 12b, the deformable member 14c, and the second movable member 12c is damaged such as broken.

As to the second variant example, the oscillation mirror unit 10c used as an optical deflector includes, for example, the first movable member 12b, and the second movable member 12c disposed on the first movable member 12b. The first movable member 12b that rotates or pivots about the first rotation axis O1 as the rotation center, and the second movable member 12c that rotates or pivots about the second rotation axis O2, perpendicular to the first rotation axis O1, as the rotation center.

The first movable member 12b rotates about the first rotation axis O1 by the meandering deformable member 14b when the meandering deformable member 14b shrinks or expands (i.e., deforms). The second movable member 12c rotates about the second rotation axis O2 by the deformable member 14c when the deformable member 14c shrinks or expands (i.e., deforms). Each of the first movable member 12b and the second movable member 12c is rotatable independently. Similar to the first embodiment, the second movable member 12c includes the reflection member 13 made of material having the higher reflectance, and the light flux L is reflected on the reflection member 13. The oscillation mirror unit 10c can be used as an optical deflector of an optical scanning apparatus, in which when the reflection member 13 rotates about the first rotation axis O1, the reflection light is directed to a sub-scanning direction such as Y direction, and when the reflection member 13 rotates about the second rotation axis O2, the reflection light is directed to a main scanning direction such as X direction.

With this configuration, the oscillation mirror unit 10c can be used as the piezoelectric actuator device having two rotation axes by combining two drivers in a nested structure. The oscillation mirror unit 10c can be used as the optical deflector that deflects the reflection light using the second movable member 12c to form an image on a surface two dimensionally.

As above described, the rotation about the first rotation axis O1 and the rotation about the second rotation axis O2 can be independently performed. Therefore, the meandering deformable member 14b can be used for the scanning operation in the sub-scanning direction, in which the scanning operation can be performed with higher driving sensitivity, which means the precision enhanced scanning operation is performed at a slower speed, and the deformable member 14c can be used for the scanning operation in the main scanning direction, in which the scanning operation can be performed with greater speed using the resonance of the deformable member 14c. Further, the maximum reflection angle of the scan light (i.e., scan angle), which is known as the oscillation angle, is set with a greater value in the main scanning direction. With this configuration, the oscillation mirror unit 10c can be used as the optical deflector that can set a greater difference between a scanning speed in the X direction and a scanning speed in the Y direction, and project an image two dimensionally with higher quality. Further, the scanning direction can be changed such as the sub-scanning direction is set along the X direction, and the main scanning direction is set along the Y direction.

Similar to the first embodiment, the power source 22 and the light shield driver 23 are electrically connected to the detection-use line 20c, and the current $I_1$ flows in the detection-use line 20c. Similar to the first embodiment, as to the second variant example too, when the detection-use line 20c is damaged and the flow of the current $I_1$ is stopped, the light shield driver 23 moves the shield member 31 to a position that blocks the entry of the light flux L to the reflection member 13. With this configuration, when the flow of the current $I_1$ is stopped, the breakage or failure of micro-structured portion such as the deformable member 14c and the meandering deformable member 14b can be detected with enhanced precision.

As to the second variant example, the detection-use line 20c is continuously formed on the meandering deformable member 14b, the first movable member 12b, the deformable member 14c, and the second movable member 12c as a power supply line. Therefore, the detection-use line 20c is formed as one line of traversable pattern, which means the detection-use line 20c does not intersect with other line, and has no portion that the detection-use line 20c is formed for a plurality of times. With this configuration, when the breakage or failure occurs at any portions along the power supply line, and then the flow of the current $I_1$ is stopped, the breakage or failure of micro-structured portion such as the deformable member 14c and the meandering deformable member 14b disposed along the power supply line can be detected with enhanced precision.

Third Variant Example of First Embodiment

Figure 6:
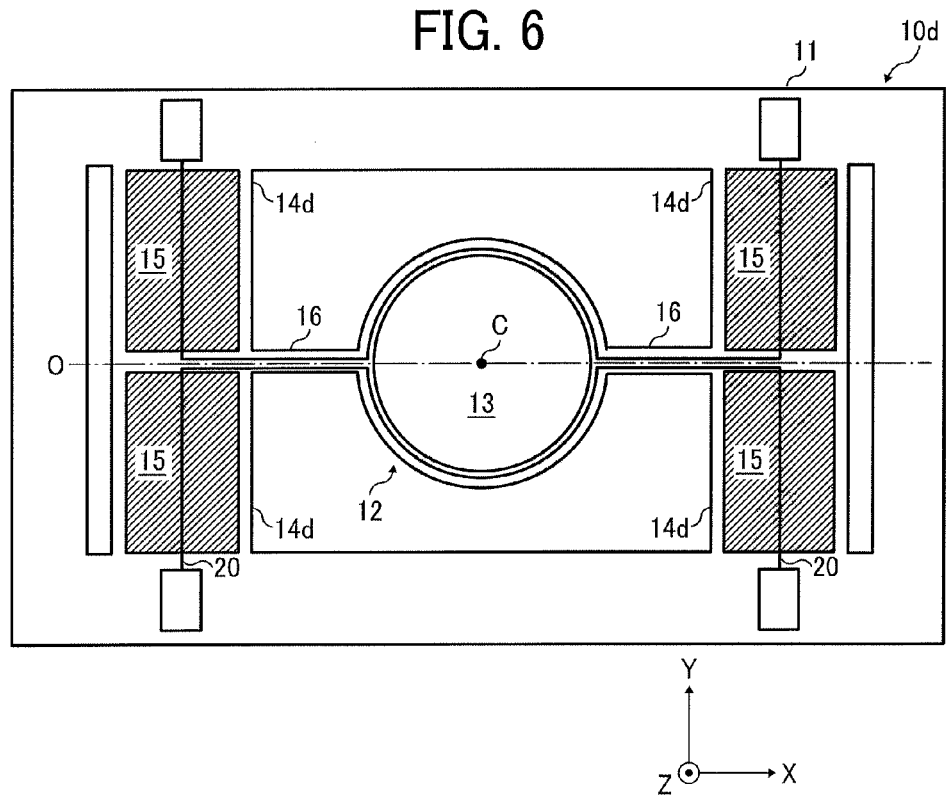
FIG. 6 illustrates a plan view of a third variant example of the deformable member.

Further, an oscillation mirror unit 10d can be devised as a third variant example as indicated in FIG. 6, in which one deformable member 14d is disposed to support the elastic support members 16 from the +Y direction, and another deformable member 14d is disposed to support the elastic support members 16 from the −Y direction, which means the elastic support members 16 are supported from both sides in the Y-axis direction (i.e., supported from ±Y direction). In this configuration, as indicated in FIG. 6, the deformable member 14d is disposed at the +Y direction of the elastic support members 16 and connected to the elastic support members 16, and the deformable member 14*d* is disposed at the −Y direction of the elastic support members 16 and connected to the elastic support members 16, and four drivers 15 are disposed. When the oscillation mirror unit 10*d* employs this configuration, the detection-use line 20*d* is formed on the deformable member 14*d*, the elastic support members 16, and the movable member 12, in which the detection-use line 20*d* is formed at each of the upper side and the lower side as indicated in FIG. 6 with a symmetrical pattern. The detection-use line 20*d* is formed as one line of traversable pattern, which means the detection-use line 20*d* does not intersect with other line, and has no portion that the detection-use line 20*d* is formed for a plurality of times. Further, the third variant example can be combined with the first variant example, the second variant example, or both of the first variant example and the second variant example to operate the oscillation mirror unit 10 two dimensionally on the XY plane.

Variant Examples of Light Shield Unit

A description is given of variant examples of the light shield unit 30 with reference to FIGS. 7A to 7H. FIGS. 7A, 7C, 7E and 7G illustrate the variant examples of the light shield unit 30 under a normal operation condition that the current $I_1$ is flowing in the detection-use line 20. FIGS. 7B, 7D, 7F and 7H illustrate the variant examples of the light shield unit 30 under a damaged condition that the flow of current $I_1$ in the detection-use line 20 is stopped.

Figure 7A:
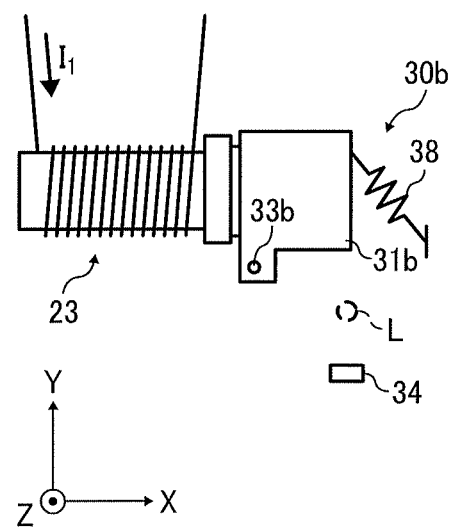
FIGS. 7A, 7B, 7C, 7D, 7E, 7F, 7G and 7H illustrate variant examples of a light shield driver of FIG. 2.
Figure 7B:
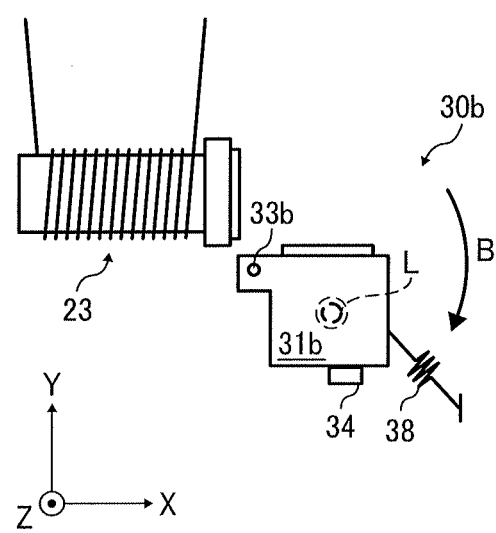

FIGS. 7A and 7B illustrate a light shield unit 30*b* of a first variant example. As indicated in FIG. 7A, when the current $I_1$ is flowing in the detection-use line 20, a shield plate 31*b* used as the shield member 31 contacts the light shield driver 23, and is held by the light shield driver 23. The shield plate 31*b* is rotatable or pivotable about a fixed shaft 33*b*, which is fixed to the casing that is not movable. The light shield unit 30*b* includes a biasing member such as a spring 38 that effects the shield plate 31*b*. The spring 38 is fixed, for example, to the casing that is not movable as indicated in FIGS. 7A and 7B. With this configuration, the biasing force of the spring 38 that effects the shield plate 31*b* can be used as a drive force to rotate the shield plate 31*b* in a direction B in FIG. 7A.

As indicated in FIG. 7A, under the normal operation condition, the pull force that the light shield driver 23 pulls the shield plate 31*b* is set greater than the biasing force of the spring 38 that biases the shield plate 31*b* to the direction B. If the damage occurs the detection-use line 20 (i.e., flow of the current $I_1$ is stopped) as indicated in FIG. 7B, the biasing force of the spring 38 effects the shield plate 31*b* to the −Y direction, and then the shield plate 31*b* pivots to the direction B and moves to a position that blocks the entry of the light flux L to the reflection member 13. With this configuration, when the flow of the current $I_1$ is stopped (i.e., damage occurs to the detection-use line 20), the entry of the light flux L to the reflection member 13 can be blocked.

Figure 7C:
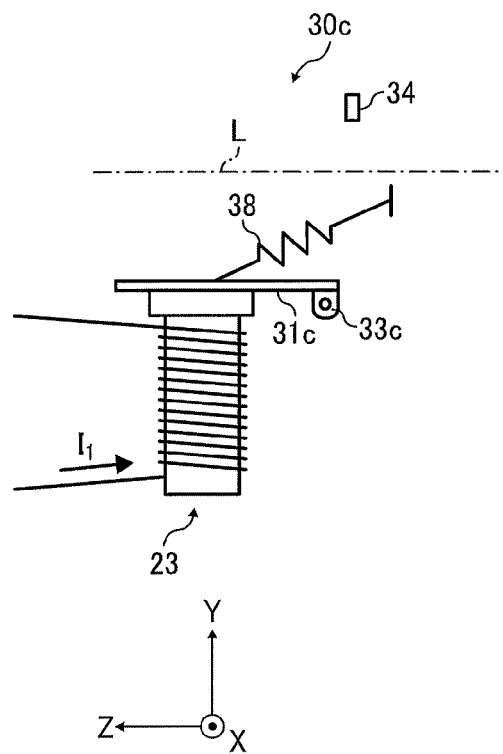
Figure 7D:
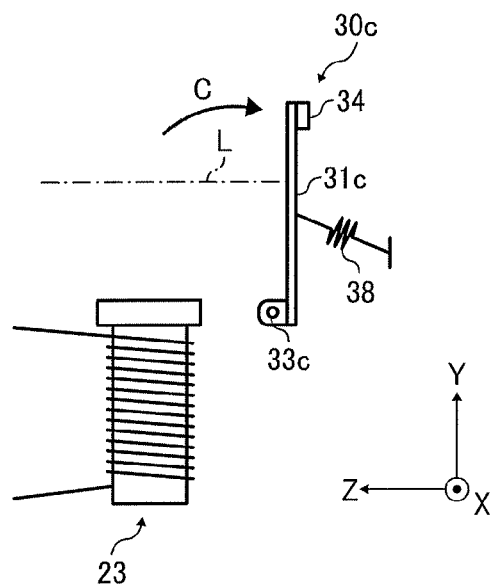

FIGS. 7C and 7D illustrate a light shield unit 30*c* of a second variant example. As indicated in FIG. 7C, under the normal operation condition that the current $I_1$ is flowing in the detection-use line 20, a shield plate 31*c* used as the shield member 31 contacts the light shield driver 23, and is held by the light shield driver 23. The shield plate 31*c* is rotatable or pivotable about a fixed shaft 33*c*, which is fixed to the casing that is not movable. The power source 22 supplies the first current $I_1$ to the detection-use line 20.

In this configuration, the light shield driver 23 is electrically connected to the detection-use line 20. Therefore, as to the second variant example of FIG. 7C, when the flow of the first current $I_1$ is stopped, the biasing force of the spring 38 pivots the shield plate 31*c* into a direction C as indicated in FIG. 7D.

As indicated in FIG. 7C, under the normal operation condition, the shield plate 31*c* is pulled to the −Y direction by the light shield driver 23, and the light shield driver 23 supports the shield plate 31*c*, in which the shield plate 31*c* does not exist in the light path of the light flux L, which means that the shield plate 31*c* is set at a position outside the light path of the light flux L.

As indicated in FIG. 7C, under the normal operation condition, the pull force that effects the shield plate 31*c* to the −Y direction by the light shield driver 23 is greater than the biasing force of the spring 38 fixed to the casing that is not movable. Therefore, the shield plate 31*c* is set at the position outside the light path of the light flux L. If the damage occurs to the detection-use line 20 (i.e., flow of the current $I_1$ is stopped), as indicated in FIG. 7D, the biasing force of the spring 38 alone effects the shield plate 31*c*, with which the shield plate 31*c* pivots to the direction C and moves to a position that blocks the entry of the light flux L to the reflection member 13. With this configuration, when the flow of the current $I_1$ is stopped (i.e., damage occurs to the detection-use line 20), the entry of the light flux L to the reflection member 13 can be blocked.

Figure 7E:
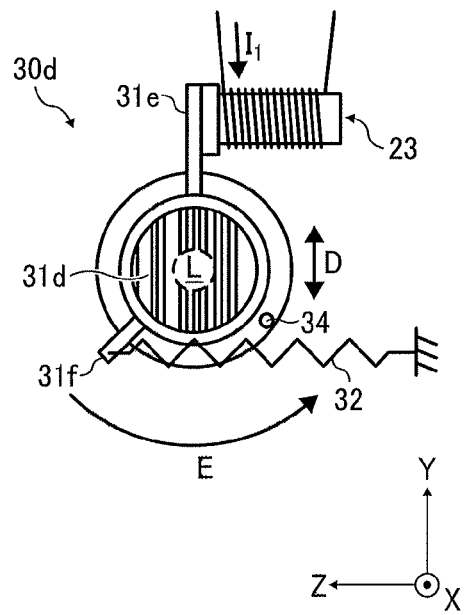
Figure 7F:
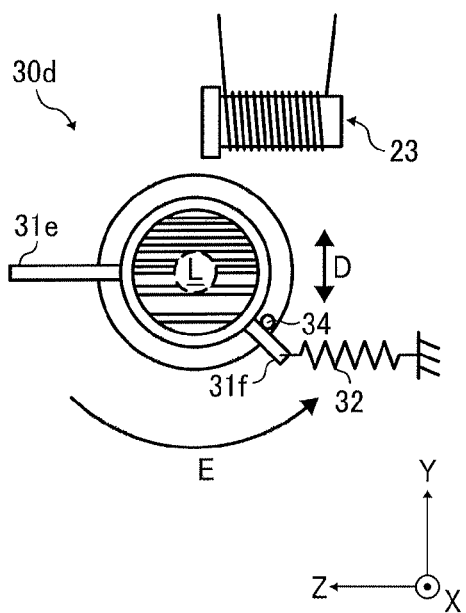

FIGS. 7E and 7F illustrate a light shield unit 30*d* of third variant example. As indicated in FIG. 7E, the light shield unit 30*d* includes, for example, a polarization plate 31*d*, which is an example of the shield member 31 that can pass linearly polarized light, and block light other than the linearly polarized light. The polarization plate 31*d* is disposed with, for example, a spring 32, a first rotation regulator 31*e*, and a second rotation regulator 31*f*. The spring 32, used as the biasing member, biases the polarization plate 31*d* to a direction E (i.e., −Z direction) to rotate the polarization plate 31*d*. The first rotation regulator 31*e* receives a pressing force from the light shield driver 23. The second rotation regulator 31*f* is biased by the biasing force of the spring 32. As indicated in FIG. 7E, the polarization plate 31*d* is set at a position that is on the light path of the light flux L. Under the normal operation condition, the polarization plate 31*d* is set with one orientation so that a polarization direction of the polarization plate 31*d* that can pass through linearly polarized light is aligned with a polarization direction (i.e., direction D) of the light flux L such as laser light. The polarization plate 31*d*, supported by a frame such as a casing that is not movable, is rotatable into the direction E. Under the normal operation condition, the first rotation regulator 31*e* contacts the light shield driver 23, and the first rotation regulator 31*e* is pulled by the light shield driver 23 in the −Z direction, with which the polarization direction of the polarization plate 31*d* is set parallel to the Y direction, and thereby the light flux L passes through the polarization plate 31*d*.

If the damage occurs to the detection-use line 20 (i.e., flow of the current $I_1$ is stopped), as indicated in FIG. 7F, the pull force that the light shield driver 23 pulls the first rotation regulator 31*e* in the −Z direction becomes zero, and then the polarization plate 31*d* pivots or rotates into the direction E by the biasing force of the spring 32 effecting into the −Z direction. Then, when the second rotation regulator 31*f* contacts the stopper 34, in other words, when the second rotation regulator 31*f* rotates to the direction E for 90 degrees, and the polarization plate 31*d* stops the rotation to the direction E, the polarization direction of the polarization plate 31*d* that can pass the light is shifted to a direction parallel to the Z direction, in which the polarization direction of the light flux L (i.e., direction D) and the polarization direction of the polarization plate 31d that can pass the light becomes perpendicular with each other, with which the passing of the light flux L is blocked by the polarization plate 31d.

With this configuration, when the flow of the current $I_1$ is stopped (i.e., the damaged condition of the detection-use line 20 occurs), the entry of the light flux L to the reflection member 13 can be blocked.

In an example case of FIGS. 7E and 7F, the light flux L may be laser light, and the polarization direction of the polarization plate 31d is set parallel to the Y direction under the normal operation condition, but is not limited thereto. For example, two polarization plates 31d can be used instead of one polarization plate 31d. Under the normal operation condition, the polarization directions of two polarization plates 31d can be aligned with the same polarization direction of the light path of the light flux L. When the damage occurs, one of two polarization plates 31d is rotated so that the polarization directions of two polarization plates 31d become perpendicular with each other. The operation of the light shield unit 30d described with reference to FIGS. 7E and 7F can be also used when the two polarization plates 31d are used. With this configuration, when the flow of the current $I_1$ is stopped (i.e., damage occurs to the detection-use line 20), the entry of the light flux L to the reflection member 13 can be blocked.

Figure 7G:
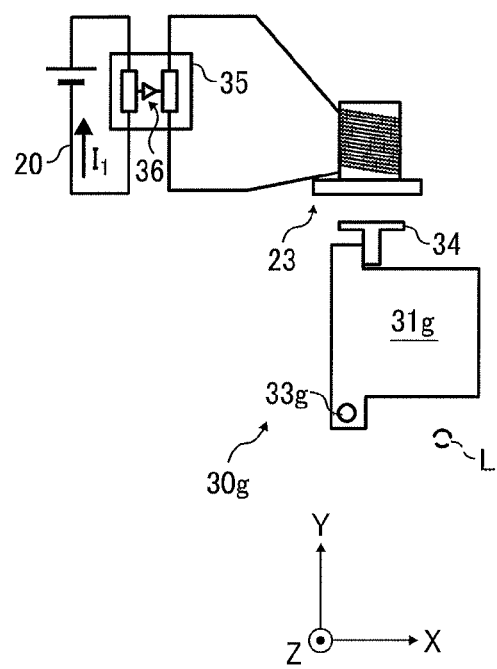
Figure 7H:
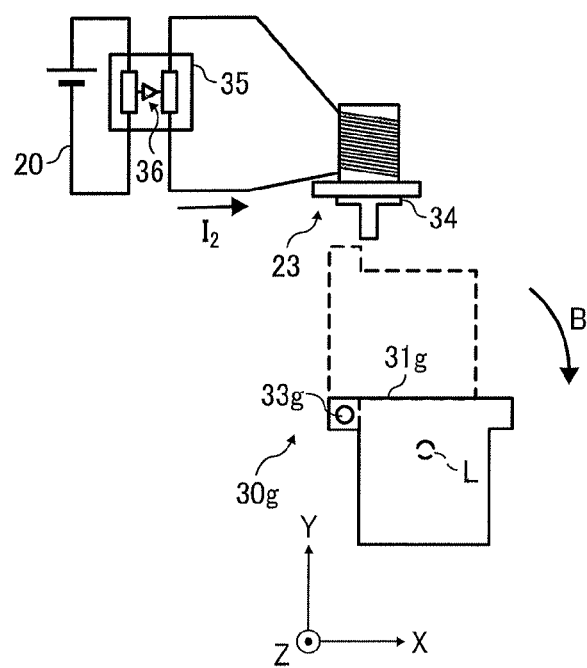

Further, FIGS. 7G and 7H illustrate a light shield unit 30g of a fourth variant example. As indicated in FIGS. 7G and 7H, when the flow of the first current $I_1$ is stopped (i.e., damage occurs to the detection-use line 20), the stopper 34 used an engagement member is moved, released or disengaged from a shield plate 31g used as the shield member 31. In the fourth variant example, the light shield unit 30g includes a current amplifier 35 as indicated in FIG. 7G. The power source 22 supplies the first current $I_1$ to the detection-use line 20. The current amplifier 35 supplies a second current $I_2$ as a drive-current to activate or operate the light shield unit 30g, in which the level of the second current $I_2$ is set, for example, proportional to the level of the first current $I_1$. The current amplifier 35 includes a NOT circuit 36 in the current amplifier 35. The current amplifier 35 including a NOT circuit 36 supplies the power (i.e., second current $I_2$) when the supply of the first current $I_1$ is stopped. As indicated in FIG. 7G, under the normal operation condition, the shield plate 31g used as the shield member 31 is biased to the direction B while the shield plate 31g contacts or engages the stopper 34, with which the shield plate 31g is being held at one position that is outside the light path of the light flux L. When the flow of the first current $I_1$ is stopped (i.e., damage occurs to the detection-use line 20) and then the second current $I_2$ is supplied, the stopper 34 is pulled to the light shield driver 23 (i.e., +Y direction), and then the shield plate 31g is released from the stopper 34 as indicated in FIG. 7H, with which the shield plate 31g rotates to the direction B, and the light shield unit 30g blocks at least one of the entry and exit of the light flux L as indicated in FIG. 7H.

Typically, a power required to move a diver or a drive unit that performs the above described mechanical movement is greater than a power required to drive the actuator device such as the piezoelectric actuator device, and thereby the level of the first current $I_1$ flowing in the detection-use line 20 is not be enough for moving the drive unit. Therefore, as to the fourth variant example, the light shield unit 30g includes, for example, the current amplifier 35. With this configuration, the second current $I_2$ having an enough power can be generated without considering the first current $I_1$, in which the first current $I_1$ can be set smaller, and thereby the power saving can be achieved. Further, the light shield unit 30g includes the NOT circuit 36. By employing the NOT circuit 36 that can supply the power (i.e., second current $I_2$) to the drive unit when the supply of the first current $I_1$ is stopped, the configuration of the light shield driver 23 can be changed into many variations. Further, the configuration using the current amplifier 35 and the NOT circuit 36 can be combined with other embodiments.

Second Embodiment

Figure 8A:
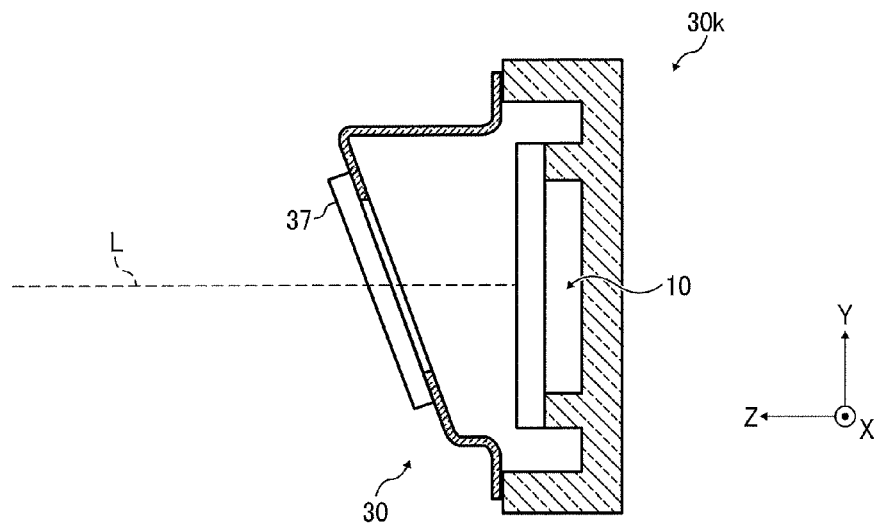
FIGS. 8A and 8B illustrate an example of an actuator device of a second embodiment using a liquid crystal panel.
Figure 8B:
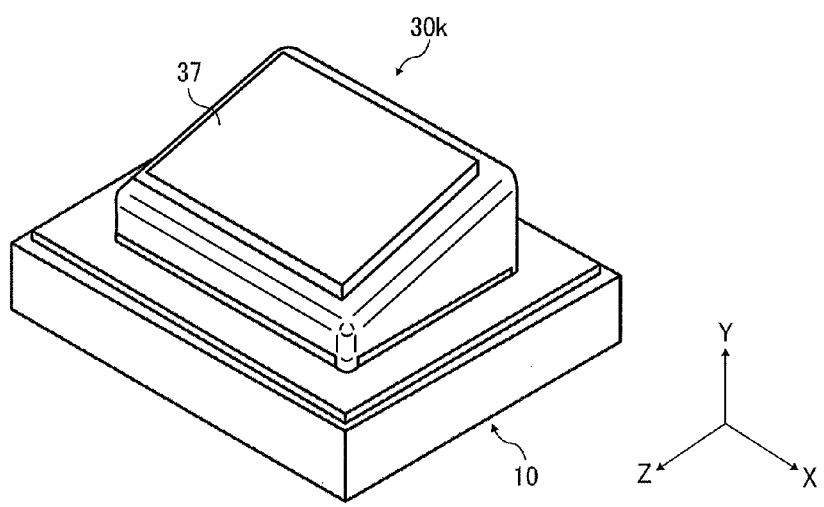
Figure 9A:
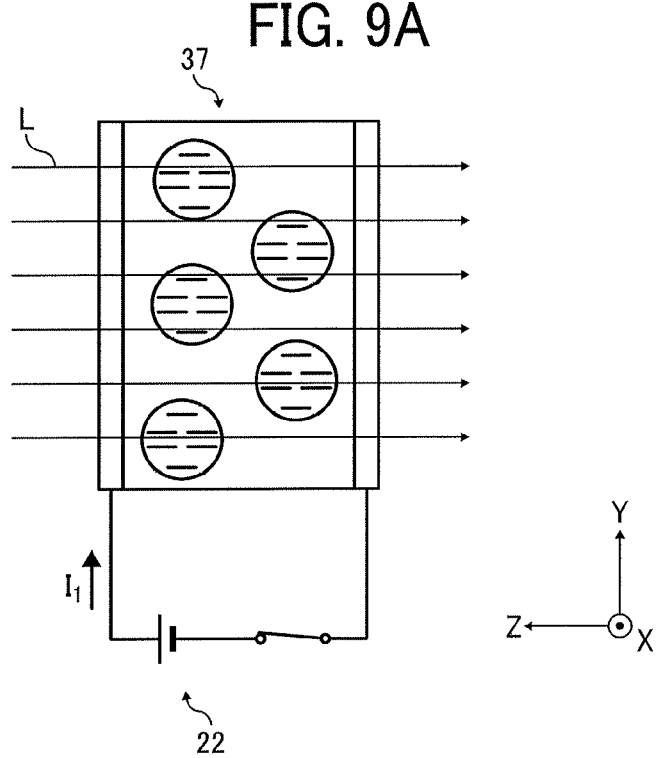
FIGS. 9A and 9B illustrate an example of an operation of the actuator device of FIG. 8.
Figure 9B:
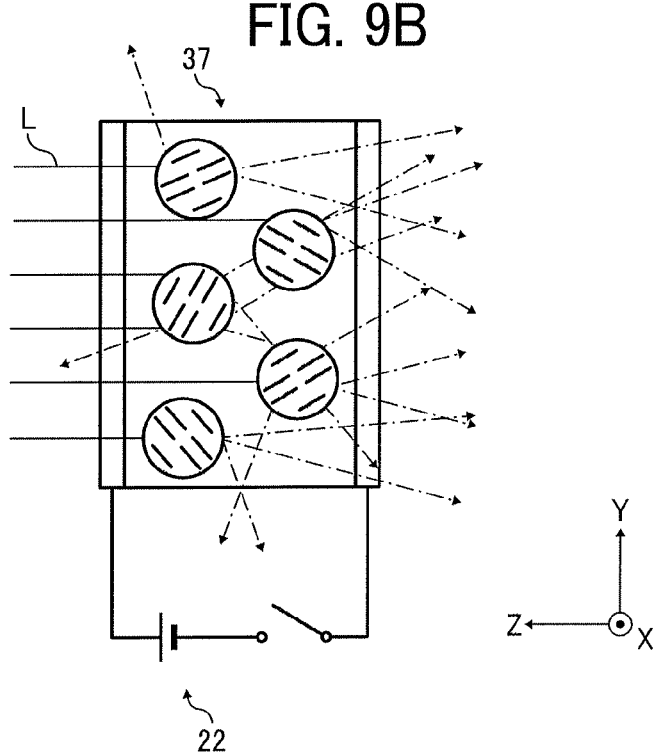

A description is given of a second embodiment with reference to FIGS. 8 and 9. FIGS. 8 and 9 illustrate a light shield unit 30K of a second embodiment using light-transmissive element that can change light transmittance by changing conditions. As indicated in FIGS. 8A and 8B, the light shield unit 30K includes, for example, a liquid crystal panel 37 including composites such as liquid crystal elements disposed on the light path of the light flux L, in which it is configured that the current $I_1$ flows in the liquid crystal panel 37 under the normal operation condition. As illustrated in FIG. 9A, when the current $I_1$ flows in the liquid crystal panel 37 (i.e., normal operation condition), the orientation direction of each of the liquid crystal elements is set to one direction that can pass the light flux L. Then, when the flow of the first current $I_1$ is stopped (i.e., damage occurs to the detection-use line 20), the orientation direction of each of the liquid crystal elements of the liquid crystal panel 37 become random directions as indicated in FIG. 9B, with which the liquid crystal panel 37 is changed to a shield condition that blocks the light flux L, with which the light flux L does not pass through the liquid crystal panel 37.

With this configuration, the passing of the light flux L can be selectively set without using a mechanical driver or mechanical driving unit, with which the effect of the external vibration to the oscillation mirror unit 10 can be reduced, and when the flow of the current $I_1$ is stopped (i.e., damage occurs to the detection-use line 20), the entry of the light flux L to the reflection member 13 can be blocked. Further, the light shield unit 30K can use other light-transmissive element that can change light transmittance by controlling electrical factors such as voltage, current or both of voltage and current. For example, the light shield unit 30K can use electrochromic elements using coloring matter that can change color by applying voltage as the light-transmissive element.

Image Forming Apparatus

Figure 10:
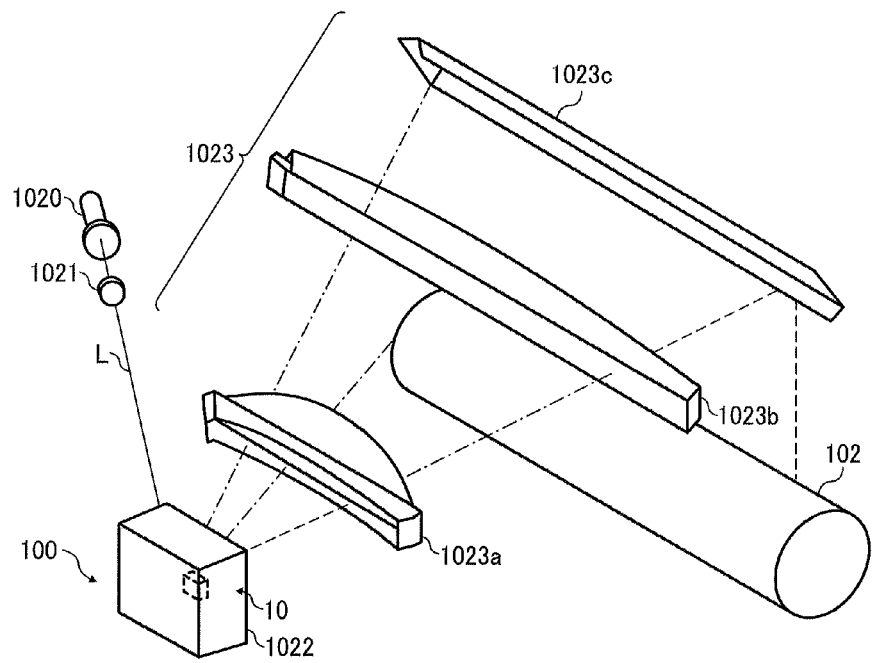
FIG. 10 is a perspective view of an example hardware diagram of an optical scanning apparatus of a third embodiment of the present disclosure.
Figure 11:
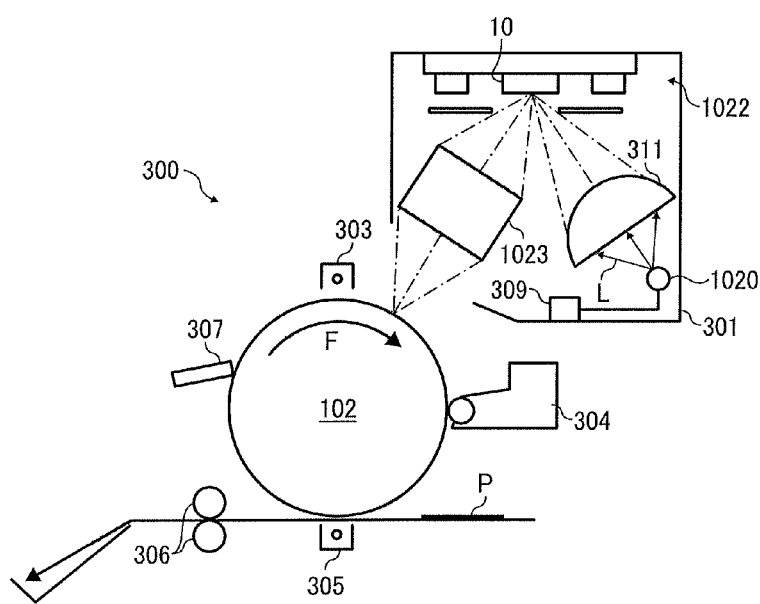
FIG. 11 is a schematic diagram of an image forming apparatus using the optical scanning apparatus of FIG. 10.

A description is given of an optical scanning unit and an image forming apparatus using the optical scanning unit as a third embodiment with reference to FIGS. 10 and 11, in which the oscillation mirror unit 10 described in the first embodiment or the second embodiment can be used. Hereinafter, the oscillation mirror unit 10 may mean any one of the above described oscillation mirror units 10, 10b, 10c, 10d, and an oscillation mirror unit 10e to be described later. A description is given of an optical scanning unit 100 having an optical deflector 1022 using the oscillation mirror unit 10, and an image forming apparatus 300 using the optical scanning unit 100 as the third embodiment. The optical scanning unit 100 includes the optical deflector 1022, which includes the oscillation mirror unit 10 of the first embodiment, as one integrated reflection unit. The optical scanning unit 100 is used to optically scan a scan face in one axis direction. FIG. 10 is a perspective view of an example hardware diagram of the optical scanning unit 100 of the third embodiment.

As indicated in FIG. 10, in the optical scanning unit 100, light such laser light emitted from a light source unit 1020 such as a laser element passes through an image focusing unit 1021 such as a collimator lens, and then the light is deflected by the optical deflector 1022. The optical deflector 1022 can employ the optical deflector of the first embodiment or the optical deflector of the second embodiment. Then, the laser light deflected by the optical deflector 1022 passes through an optical scanning system 1023 having a first lens 1023a, a second lens 1023b, and a reflection mirror 1023c, and then the laser light is irradiated on a scan face of a photoconductor drum 102. The optical scanning system 1023 forms a light beam spot on the scan face of the photoconductor drum 102.

Each of electrodes of piezoelectric elements of the optical deflector 1022 is connected to an external power source used as a mirror driver. When the mirror driver applies the drive voltage to the upper electrode and the lower electrode of the piezoelectric elements, the optical deflector 1022 is driven. Then, the mirror disposed in the optical deflector 1022 oscillates to deflect the laser light, and then the scan face of the photoconductor drum 102 is optically scanned.

The optical scanning unit 100 of the third embodiment can be used as a component of an optical writing unit of the image forming apparatuses such as printers and copiers using photoconductors. Further, using different optical scanning systems, the optical scanning can be performed into the one axis direction or two axes direction, with which the optical scanning unit 100 of the third embodiment can be used as a component of an optical scanning unit of a laser labeling apparatus that irradiates laser light onto a thermal medium to print images by applying heat.

A description is given of the image forming apparatus 300 having an optical writing unit 301 using the optical scanning unit 100 with reference to FIG. 11. As to the image forming apparatus 300 of FIG. 11, the optical writing unit 301 emits a laser beam onto the scan face of the photoconductor drum 102 to write an image on the photoconductor drum 102. The photoconductor drum 102 is an image bearer or image bearing member having the scan face to be scanned by the optical writing unit 301.

The optical writing unit 301 emits one laser beam or a plurality of laser beams modulated by control signals to scan the surface of the photoconductor drum 102 along the axis direction of the photoconductor drum 102. When the photoconductor drum 102 is being rotated to a direction F in FIG. 11, the surface of the photoconductor drum 102 is charged by a charger 303. By optically scanning the charged surface of the photoconductor drum 102 using the optical writing unit 301, an electrostatic latent image is formed on the surface of the photoconductor drum 102. The electrostatic latent image is developed by a development unit 304 as a toner image, and then the toner image is transferred to a recording medium P by a transfer unit 305.

The transferred toner image is fixed on the recording medium P using a fixing unit 306. After the photoconductor drum 102 passes the transfer unit 305, the surface of the photoconductor drum 102 is cleaned by a cleaning unit 307 to remove toner remaining on the photoconductor drum 102. Instead of the photoconductor drum 102, a belt-shape photoconductor can be used. Further, the toner image can be temporarily transferred to a transfer medium that is not the recording medium, and then the toner image can be transferred to the recording medium P from the transfer medium, and fixed on the recording medium P using the fixing unit 306

The optical writing unit 301 includes, for example, a light source unit 1020, a light source driver 309, the oscillation mirror unit 10, an image focusing unit 311, the optical scanning system 1023, and the optical deflector 1022 of the third embodiment. The light source unit 1020 emits one laser beam or a plurality of laser beams modulated by control signals. The light source driver 309 modulates the light source unit 1020. The oscillation mirror unit 10 has a mirror face used as the reflection face of the optical deflector 1022. The image focusing unit 311 focuses the light flux L, emitted from the light source unit 1020 and modulated by the control signals, on the oscillation mirror unit 10. The optical scanning system 1023 forms a light beam spot on the surface of the photoconductor drum 102 used as the scan face using one or a plurality of light fluxes L reflected at the oscillation mirror unit 10. The optical deflector 1022 is mounted on a board with a circuit such an integrated circuit that drives the optical deflector 1022, and the optical deflector 1022 and the circuit mounted on the board is included in the optical writing unit 301.

The consumption power to drive the optical deflector 1022 of the third embodiment can be set smaller than the consumption power to drive a rotary polygonal mirror, with which power saving can be achieved for the image forming apparatus 300. The wind noise caused by the vibration of the oscillation mirror unit 10 of the optical deflector 1022 is smaller than the wind noise of the rotary polygonal mirror, with which quietness of the image forming apparatus 300 can be enhanced. Further, an occupying space of the optical writing unit 301 can be set smaller than an occupying space of the rotary polygonal mirror, and heat generated by the optical deflector of the optical writing unit 301 can be set little. Therefore, the optical writing unit 301 can be easily made smaller, and thereby the image forming apparatus 300 can be made smaller.

Image Projection Apparatus

Figure 12:
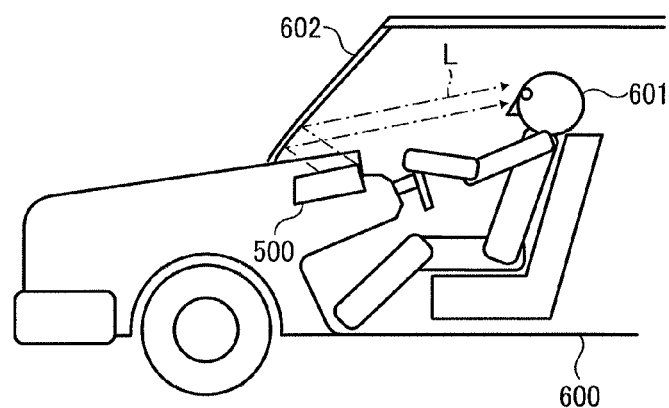
FIG. 12 is a schematic diagram of an image projection apparatus of a fourth embodiment using the optical scanning apparatus of FIG. 10.
Figure 13:
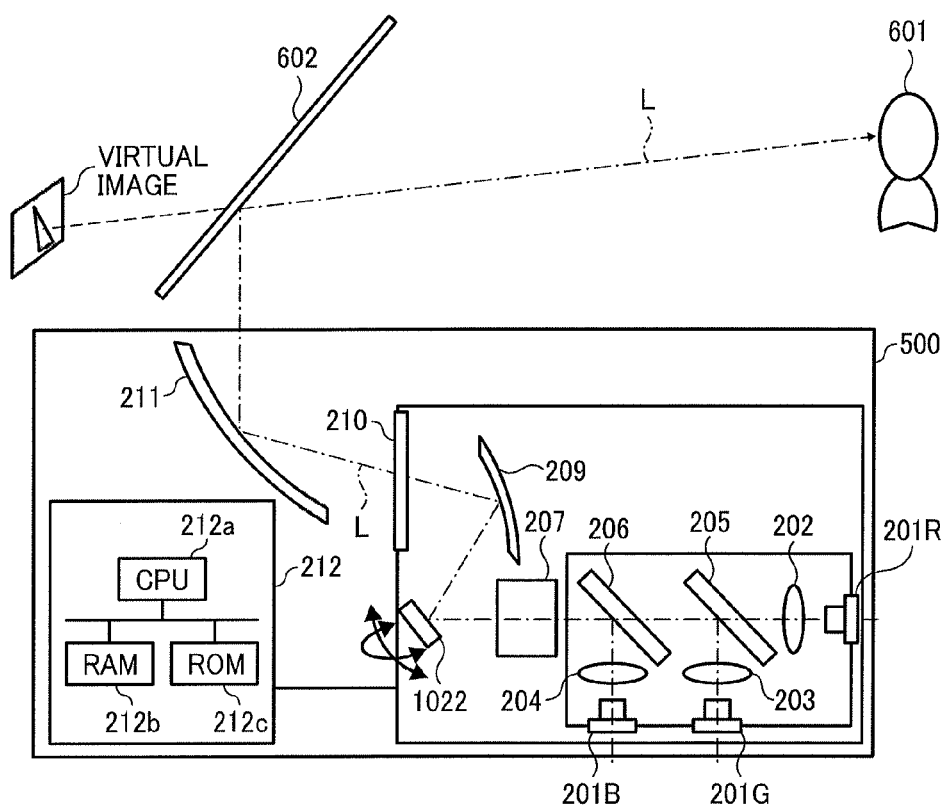
FIG. 13 is a schematic diagram of an optical scanning apparatus used in the image projection apparatus of FIG. 12.

A description is given of an image projection apparatus employing the optical deflector of the first embodiment or the second embodiment as a fourth embodiment. A description is given of the image projection apparatus of the fourth embodiment with reference to FIGS. 12 and 13. FIG. 12 is a schematic diagram of a configuration of a vehicle 600 (e.g., automobile) equipped with a head up display 500, which is an example of the image projection apparatus of the fourth embodiment. FIG. 13 is a schematic diagram of an internal configuration of the head up display 500. As to the fourth embodiment, the head up display 500 can be disposed, for example, in a dashboard of the vehicle 600. As to the head up display 500, the light flux L is emitted from the head up display 500 as an imaging light or a projection light. Then, the light flux L is reflected at a windshield 602, and then directed to a user or an observer such as a vehicle driver 601, with which the vehicle driver 601 can see or recognize the image projected by the head up display 500 as a virtual image. Further, a combiner can be set near an inner face of the windshield 602, with which the light flux L reflected by the combiner can be seen or recognized by the vehicle driver 601 as the virtual image.

As indicated in FIG. 13, the head up display 500 includes, for example, laser light sources 201R, 201G, 201B, collimator lenses 202, 203, 204, dichroic mirrors 205, 206, a light adjuster 207, an optical deflector 208, a free-curved mirror 209, a screen 210, and a projection mirror 211. The laser light sources 201R, 201G, 201B respectively emit a laser light of red, green, and blue. The collimator lenses 202, 203, 204 are respectively disposed on the laser light sources 201R, 201G, 201B. The laser light sources 201R, 201G, 201B, the collimator lenses 202, 203, 204, and the dichroic mirrors 205 and 206 can be integrated into a housing to configure a light source unit 230 used as the light source apparatus of the fourth embodiment.

As to the head up display 500 of the fourth embodiment, an intermediate image displayed on the screen 210 is projected on the windshield 602 of the vehicle 600, and the intermediate image can be seen or recognized as the virtual image by the vehicle driver 601, in which the windshield 602 is used as a projection surface. Each of the laser light emitted from the laser light sources 201R, 201G, 201B is adjusted to a substantially parallel light by the collimator lenses 202, 203, 204, and then the laser light emitted from the laser light sources 201R, 201G, 201B are synthesized by the dichroic mirrors 205 and 206. After the light adjuster 207 adjusts the intensity of the synthesized laser light, the optical deflector 208 scans the synthesized laser light two dimensionally. The projection light L scanned two dimensionally by the optical deflector 208 is reflected at the free-curved mirror 209 to correct the distortion, and is then focused on the screen 210 to display the synthesized laser light as the intermediate image on the screen 210. The screen 210 includes a micro lens array that arranges micro lenses two dimensionally, with which the screen 210 expands the light flux L by a unit of micro lens. The laser light sources 201R, 201G, 201B, the light adjuster 207, and the optical deflector 208 can be controlled by a control unit 212 including, for example, a central processing unit (CPU) 212a, a random access memory (RAM) 212b, and a read only memory (ROM) 212c.

The optical deflector 1022 can employ the optical deflector of the first embodiment or the second embodiment. The optical deflector 1022 oscillates the mirror in the main scanning direction and the sub-scanning direction to scan the projection light L two dimensionally, which is known as raster scanning. The drive control of the optical deflector 1022 is synchronized with the emission timing of the laser light sources 201R, 201G, and 201B. The head up display 500 can be applied to any moveable vehicles such as automobiles, ships, airplanes, and mobile robots, or the head up display 500 can be applied to any non-movables such as operation robots fixed at given positions to operate an operation unit such as manipulator unit. The head up display 500 can be used as the image projection apparatus.

As to the fourth embodiment, the head up display 500 is described as one example of the image projection apparatus, but is not limited thereto. The fourth embodiment having the optical deflector of the first embodiment or the second embodiment can be applied to any apparatuses that project images. For example, the fourth embodiment can be applied to a projector that projects an image on a screen, or a head mount display that projects an image on a screen made of reflective and transmissive member, in which the display screen is mounted on a head of a user. The fourth embodiment can be applied to an optical deflector that scans two dimensionally, but is not limited thereto. For example, the fourth embodiment can be applied to an optical deflector that scan any one of the main scanning direction and the sub-scanning direction.

Object Recognition Apparatus

A description is given of an object recognition apparatus as a fifth embodiment. The object recognition apparatus can employ the optical deflector of the first embodiment or the second embodiment. As to the object recognition apparatus, the optical deflector optically scans a target direction, and an object existing in the target direction is recognized by receiving the reflection light from the object.

Figure 14:
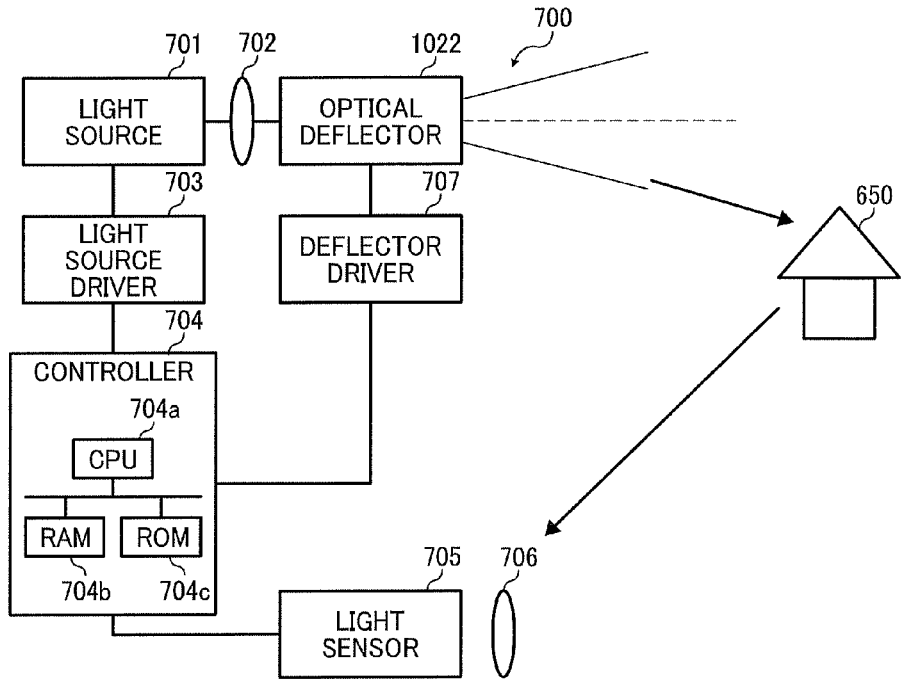
FIG. 14 is a schematic diagram of a laser radar apparatus of a fifth embodiment using the optical scanning apparatus of FIG. 10.

FIG. 14 is a schematic diagram of a laser radar apparatus 700, which is an example of the object recognition apparatus described as the fifth embodiment. As indicated in FIG. 14, the laser radar apparatus 700 includes, for example, a light source 701 such as laser light, a collimate lens 702, a light source driver 703, a controller 704, a light sensor 705, a condensing lens 706, a deflector driver 707, and the optical deflector 1022. The light flux L such as laser light emitted from the light source 701 enters the collimate lens 702. The collimate lens 702 adjusts the dispersion light to substantially parallel light. Then, the light flux L is scanned to one axis or two axes direction using the optical deflector 1022 to emit the light flux L to an object 650 ahead of a vehicle. The light sensor 705 receives the light flux L reflected at the object 650 as the reflection light via the condensing lens 706, and outputs a detection signal. The light source driver 703 drives the light source 701, and the deflector driver 707 drives the optical deflector 1022.

The controller 704 controls the light source driver 703 and the deflector driver 707, and processes the detection signal received from the light sensor 705. Specifically, the controller 704 calculates a distance to the object 650 based on a difference of a time point when the light source 701 emits the light flux L and a time point when the light sensor 705 receives the reflection light reflected from the object 650. By scanning the laser light one dimensionally or two dimensionally using the optical deflector 1022, the distance to the object 650 can be obtained. The laser radar apparatus 700 can be provided using the above described optical deflector, which can detect the damaged condition effectively. The laser radar apparatus 700 is equipped, for example, at a front of the vehicle to monitor ahead of the vehicle to recognize objects in the ahead direction of the vehicle.

As to the fifth embodiment, the laser radar apparatus 700 is described as an example of the object recognition apparatus, but is not limited thereto. The object recognition apparatus that uses the optical deflector of the first embodiment or the second embodiment can be applied to other apparatuses used for optically scanning the target direction, and recognizing an object in the target direction by receiving the reflection light from the object. For example, the object recognition apparatus can be applied biometrics apparatus to optically scan hand and face and to compare the scan data with pre-set data to recognize a target, a security sensor to recognize an intruder by optically scanning a target direction, a three dimensional scanner to recognize a shape of object from distance information obtained by the optical scanning and outputs three dimensional data. Further, the object recognition apparatus can be configured to recognize an existence of the object and a shape of object based on light intensity of the reflection light received by a receiver and a change of frequency of the reflection light received by the receiver.

Figure 15:
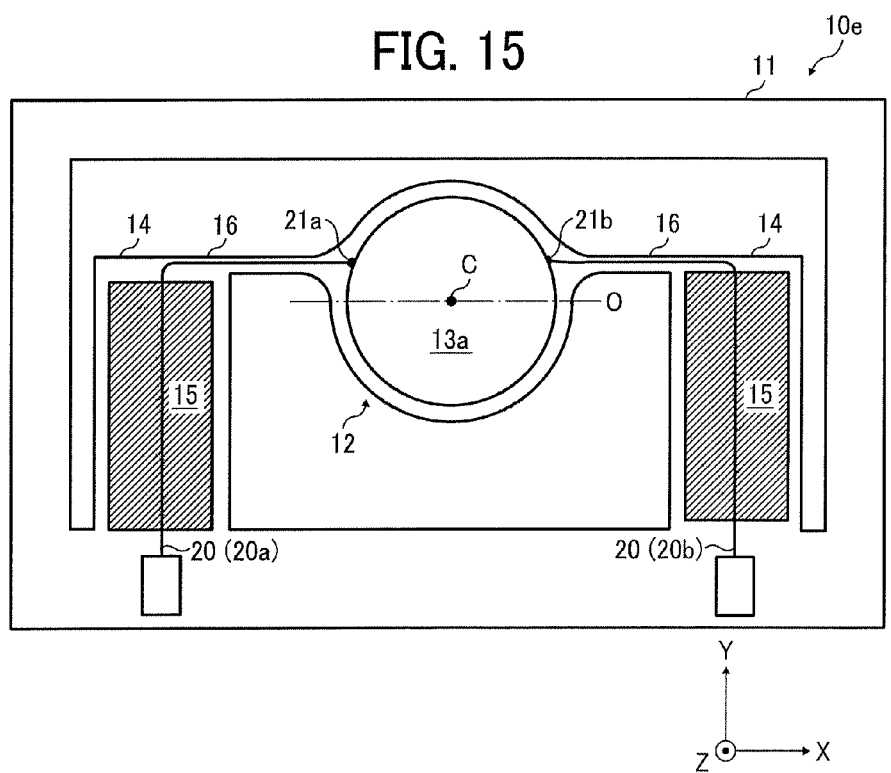
FIG. 15 is an actuator device of a sixth embodiment of the present disclosure, which is a variant example of the actuator device of FIG. 1.

A description is given of a variant example the detection-use line of the first embodiment and the second embodiment as a sixth embodiment with reference to FIG. 15. Since the configuration other than the detection-use line is same as the first embodiment and the second embodiment, the same units are not described for the sixth embodiment. As indicated in FIG. 15, an oscillation mirror unit 10e includes the movable member 12 formed with a reflection member 13a. The reflection member 13a is, for example, a thin metal layer or film having conductivity made of electrically conductive material, but not limited to the thin metal layer. The reflection member 13a can be any material having conductivity. As to the sixth embodiment, the detection-use line 20 includes two detection-use lines such as a first detection-use line 20a and a second detection-use line 20b as indicated in FIG. 15. The first detection-use line 20a is disposed at the −X direction side of the reflection member 13a, and the second detection-use line 20b is disposed at the t+X direction side of the reflection member 13a. As indicated in FIG. 15, the first detection-use line 20a is connected with the reflection member 13a at a contact point 21a, and the second detection-use line 20b is connected with the reflection member 13a at a contact point 21b. Therefore, as to the sixth embodiment, the reflection member 113a having conductivity is used as a part of the detection-use line 20. With this configuration, the detection-use line 20 is not formed on the movable member 12 as a line, with which the detection-use line 20 can be formed further easily, and an area used as the reflection member 113a on the movable member 12 can be set greater. The reflection member 13a can be formed on the movable member 12 by processing the thin metal layer formed on the silicon base 141 into a given shape. Further, the first detection-use line 20a and the second detection-use line 20b can be formed by processing the thin metal layer formed on the silicon base 14 into a given shape. If the reflection member 13a, the first detection-use line 20a, and the second detection-use line 20b are formed by processing the same thin metal layer formed on the silicon base 14, the reflection member 13a and the detection-use line 20 can be performed at the same time, with which the process of forming the reflection member 13a and the detection-use line 20 can be simplified.

As to the above described embodiments, the piezoelectric element is used as the actuator device to drive the deformable member 14, but is not limited thereto. For example, the actuator device using the electrostatic driving method or the resonance driving method can be used to drive the deformable member 14 to rotate the reflection face. As to the above described embodiments, the driver to drive the movable member in the main scanning direction such as oscillation movement of the movable member, and the driver to drive the movable member in the sub-scanning direction such as oscillation movement of the movable member use the same driving method, but is not limited thereto. For example, the two drivers can use different driving methods.

As to the above described embodiments, the driver 15 uses the piezoelectric element and the piezoelectric driving method, but is not limited thereto. For example, the electrostatic driving method can be used to deform the deformable member 14 by applying the electrostatic force generated by applying a voltage between a plurality of electrodes, and the electromagnetic driving method can be used to deform the deformable member 14 by applying the electromagnetic force generated by the magnet and the flowing current.

As to the above described embodiments, the number of the reflection mirror is one, but is not limited thereto. For example, if the oscillation angle in the main scanning direction and/or the sub-scanning direction is not enough when the number of the reflection mirror is one, a plurality of reflection mirrors having the same configuration such as two reflection mirrors can be disposed to enhance the scanning range. With this configuration, the scanning range can be enhanced even if the scanning range set by the oscillation angle of one single reflection mirror is small.

As to the above described first embodiment and the second embodiment, the deformable member 14 is disposed in a direction perpendicular to the rotation axis, but is not limited thereto. For example, the deformable member 14 can be disposed in a direction not perpendicular to the rotation axis as long as the direction of the deformable member 14 crosses the rotation axis. As to the above described embodiments, the detection-use line is formed on an outer face or layer such as a top face of the deformable member 14, but is not limited thereto. For example, the detection-use line can be formed inside the deformable member 14, can be formed a side of the deformable member 14, or can be formed on the bottom face of the deformable member 14.

As to the above described embodiments, the breakage of a micro-structured portion of the actuator device can be detected with an enhanced precision.

Numerous additional modifications and variations are possible in light of the above teachings. It is therefore to be understood that within the scope of the appended claims, the disclosure of the present disclosure may be practiced otherwise than as specifically described herein. For example, elements and/or features of different examples and illustrative embodiments may be combined each other and/or substituted for each other within the scope of this disclosure and appended claims.

What is claimed is:
1. An actuator device comprising:
a frame;
a movable member to rotate about a rotation axis;
a reflection member formed on the movable member to reflect a light flux that enters the reflection member;
a first deformable member disposed on the frame to support and move the movable member;
at least one first driver to deform the first deformable member;
a detection-use line formed on the first deformable member and on the movable member to allow an electric current; and
a light shield unit disposed at least one of a light incident side of the reflection member and a light exit side of the reflection member,
wherein the light shield unit blocks at least one of an entry of the light flux to the reflection member and an exit of the light flux from the reflection member when the detection-use line is damaged.
2. The actuator device of claim 1, further comprising:
a second deformable member disposed on the frame to support and move the movable member, and
at least one second driver to deform the second deformable member,
wherein the movable member is supported by the first deformable member at a first side of the movable member and by the second deformable member at a second side of the movable member,
wherein the detection-use line extends from one end of the first deformable member, along the movable member, and to one end of the second deformable member.
3. The actuator device of claim 2 wherein the detection-use line is formed on an outer face of the first deformable member and the second deformable member.
4. The actuator device of claim 1, further comprising:
a power source to supply a first current to the detection-use line; and
a current amplifier to supply a second current to the light shield unit to operate the light shield unit, the second current proportional to the first current, wherein when the detection-use line is damaged and the first current is stopped, the current amplifier supplies the second current to the light shield unit to move the light shield unit to block at least one of the entry of the light flux to the reflection member and the exit of the light flux from the reflection member.

5. The actuator device of claim 1, wherein when the light shield unit is moved to block at least one of the entry of the light flux to the reflection member and the exit of the light flux from the reflection member when the detection-use line is damaged, the light shield unit is at a position of maximum intensity of the light flux.

6. The actuator device of claim 1, wherein the light shield unit includes a shield member settable on a first position that is on a light path of the light flux and a second position that is out of the light path of the light flux, and a light shield driver to move the shield member from the second position to the first position when the detection-use line is damaged.

7. The actuator device of claim 1, wherein the light shield unit uses a light-transmissive element that changes light transmittance by controlling electrical factors including voltage, current, or both of the voltage and the current to block at least one of the entry of the light flux to the reflection member and the exit of the light flux from the reflection member when the detection-use line is damaged.

8. The actuator device of claim 2, wherein the reflection member is made of an electrically conductive material, and the detection-use line formed on the first deformable member and on the second deformable member are connected to the reflection member made of the electrically conductive material.

9. An optical deflector comprising:
the actuator device of claim 1; and
a light source unit to emit light flux to the actuator device;
wherein the actuator device reflects the light flux that enters the actuator device using the reflection member to perform an optical scanning operation using the light flux.

10. An image projection apparatus comprising:
the actuator device of claim 1; and
a light source unit to emit light flux to the actuator device;
wherein the actuator device reflects the light flux that enters the actuator device using the reflection member, and the light flux reflected by the reflection member is directed to a projection surface to generate an image on the projection surface.

11. An image forming apparatus comprising:
a photoconductor;
the actuator device of claim 1; and
a light source unit to emit light flux to the actuator device,
wherein the actuator device reflects the light flux that enters the actuator device using the reflection member to scan a surface of the photoconductor using the light flux to form a latent image on the photoconductor.

* * * * *